United States Patent
Joely et al.

(10) Patent No.: US 11,673,748 B2
(45) Date of Patent: Jun. 13, 2023

(54) NON-CONTACT SUPPORT PLATFORM WITH OPEN-LOOP CONTROL

(71) Applicant: Core Flow Ltd., Daliyat el-Karmel (IL)

(72) Inventors: Eric Joely, P.O. Misgav (IL); Boaz Nishri, Kibbutz Maagan Michael (IL); Ronen Lautman, Haifa (IL)

(73) Assignee: Core Flow Ltd., Daliyat el-Karmel (IL)

(*) Notice: Subject to any disclaimer, the term of this patent is extended or adjusted under 35 U.S.C. 154(b) by 26 days.

(21) Appl. No.: 17/056,439

(22) PCT Filed: Jun. 6, 2019

(86) PCT No.: PCT/IL2019/050644
§ 371 (c)(1),
(2) Date: Nov. 18, 2020

(87) PCT Pub. No.: WO2019/239403
PCT Pub. Date: Dec. 19, 2019

(65) Prior Publication Data
US 2021/0188567 A1 Jun. 24, 2021

Related U.S. Application Data

(60) Provisional application No. 62/682,942, filed on Jun. 10, 2018.

(51) Int. Cl.
*B65G 43/08* (2006.01)
*B65G 49/06* (2006.01)
(Continued)

(52) U.S. Cl.
CPC ......... *B65G 43/08* (2013.01); *B65G 49/065* (2013.01); *B65G 51/03* (2013.01); *G05D 7/0688* (2013.01);
(Continued)

(58) Field of Classification Search
None
See application file for complete search history.

(56) References Cited

U.S. PATENT DOCUMENTS

| 6,409,434 B1 | 6/2002 | Winther |
| 7,530,778 B2 | 5/2009 | Yassour et al. |

(Continued)

OTHER PUBLICATIONS

International Search Report for PCT Application No. PCT/IL2019/050644 dated Sep. 5, 2019.
(Continued)

*Primary Examiner* — William R Harp
(74) *Attorney, Agent, or Firm* — Pearl Cohen Zedek Latzer Baratz LLP

(57) ABSTRACT

A non-contact support platform with open-loop control, including: a surface, to support a workpiece by fluid-bearing of fluid flowing through a plurality of nozzles, a supply system, connected to the surface and configured to maintain the fluid-bearing by applying pressure to cause flow of the fluid out of a subset of the plurality of nozzles, and a controller, to control fluid flow in the supply system with an open-loop circuit to support the workpiece while it moves over the non-contact support platform, wherein the fluid flow is controlled based on at least parameter of a group of workpiece parameters consisting of a position of the workpiece, dimensions of the workpiece and a velocity of the workpiece while supported by the surface.

20 Claims, 4 Drawing Sheets

(51) Int. Cl.
    *B65G 51/03*    (2006.01)
    *G05D 7/06*    (2006.01)
(52) U.S. Cl.
    CPC .. *B65G 2201/022* (2013.01); *B65G 2203/025* (2013.01); *B65G 2203/0233* (2013.01); *B65G 2203/0258* (2013.01); *B65G 2203/0266* (2013.01); *B65G 2249/00* (2013.01)

(56) References Cited

U.S. PATENT DOCUMENTS

| | | | |
|---|---|---|---|
| 7,604,439 B2 | 10/2009 | Yassour et al. | |
| 8,834,073 B2* | 9/2014 | Duroe | B65G 43/08 |
| | | | 414/676 |
| 10,513,011 B2* | 12/2019 | Legerbaum | B25B 11/005 |
| 2003/0164934 A1 | 9/2003 | Nishi | |
| 2006/0054774 A1* | 3/2006 | Yassour | F16C 32/06 |
| | | | 248/631 |
| 2007/0195653 A1 | 8/2007 | Yassour et al. | |
| 2017/0294827 A1 | 10/2017 | Rubin | |

OTHER PUBLICATIONS

Chinese Office Action for CN Application No. 201980038519X dated Feb. 9, 2022.

\* cited by examiner

NON-CONTACT SUPPORT PLATFORM WITH OPEN-LOOP CONTROL

CROSS-REFERENCE TO RELATED APPLICATIONS

This application is a National Phase Application of PCT International Application No. PCT/IL2019/050644, International Filing Date Jun. 6, 2019, claiming priority from U.S. Provisional Patent Application No. 62/682,942, filed Jun. 10, 2018, which is hereby incorporated by reference.

FIELD OF THE INVENTION

The present invention relates to non-contact support platforms. More particularly, the present invention relates to non-contact support platforms with an open loop control.

BACKGROUND OF THE INVENTION

Non-contact support platforms are useful in processes that require supporting and transporting of thin, generally flat, and typically fragile, workpieces, where contact of the workpiece with solid surfaces is to be avoided. For example, a thin workpiece may include a thin pane of glass, e.g., for incorporation into a display screen, or another thin material. The process may include application of a substance or tool to the workpiece, or inspection of the workpiece.

A typical non-contact support platform includes a table whose horizontal top surface is made to be flat. The table-top includes an arrangement of nozzles, where some of the nozzles (e.g., approximately half of the nozzles) are pressure nozzles out of which air is blown to form an air cushion on which the workpiece can be supported above the table-top. The remaining nozzles are air evacuation nozzles through which air may be freely evacuated to ambient space, or sucked away by a vacuum source.

Pneumatic sources are typically used to produce pressure for forcing air through the pressure nozzles and vacuum for the sucking air through the vacuum nozzles (if vacuum nozzles are employed on the air-bearing platform).

High-performance, non-contact support platforms using air-bearing technology supplied by pneumatic sources, which are not actively controlled, can have characteristic behavior relating to the flowrate required to operate the support platform. For repeating processes, each step in the process can have a different characteristic behavior. For example, a support platform which is fully covered by a workpiece (e.g., a substrate) requires less flowrate to operate in comparison with a support platform which is not covered at all, and a partially covered support platform can require an intermediate throughput of air.

The coverage of the support platform, namely the extent at which the platform is covered, can also affect the pneumatic sources supplying the support platform. For example, a vacuum source may provide weak vacuum level when workpiece covers a small portion of the air-bearing platform, and the same vacuum source may provide stronger vacuum level when the workpiece covers a greater portion of the air-bearing platform.

A particular flowrate through the support platform may require a particular pressure field in the platform. The performance of the platform therefore depends on a particular step in a conveying process over the air-bearing platform. For example, a particular pressure field in the platform necessitates a corresponding pressure field on the wetted area of the workpiece. A workpiece may float at a height which directly depends on the pressure field on its wetted surface. Thus, the floating height of the workpiece may change depending on how much of the platform is covered by the workpiece. In order for the workpiece to float at the same height, the pressure field acting on it must be constantly controlled.

Typically, the control of the pneumatic sources can be affected by several variables like pneumatic volume, flowrate, regulators, valves' time response, etc. An adjustment in the pneumatic supply can require time until the pressure field in the platform is changed. For example, a workpiece may travel over a non-contact support platform at a speed of 0.5 meters/second. The response time that takes an adjustment of the pneumatic supply to affect the air-bearing of the workpiece may be 0.25 seconds, during which time the workpiece has moved a distance of 0.125 meters, which for various purposes may be too slow.

SUMMARY

There is thus provided, in accordance with some embodiments of the invention, a non-contact support platform with open-loop control, the non-contact support platform including: a surface, to support a workpiece by fluid-bearing of fluid flowing through a plurality of nozzles, a supply system, connected to the surface and configured to maintain the fluid-bearing by applying pressure to cause flow of the fluid out of a subset of the plurality of nozzles, and a controller, to control fluid flow in the supply system with an open-loop circuit to support the workpiece while it moves over the non-contact support platform. In some embodiments, the fluid flow may be controlled based on at least one parameter of a group of workpiece parameters consisting of a position of the workpiece, a dimension of the workpiece and a velocity of the workpiece while supported by the surface. In some embodiments, the supply system may also be configured to apply vacuum to cause flow of the fluid into another subset of the plurality of nozzles.

In some embodiments, the plurality of nozzles may include at least one of pressure nozzles and suction nozzles. In some embodiments, the supply system may include at least one of pressure source and vacuum source. In some embodiments, the controller may control the fluid flow in the supply system based on at least one parameter of the non-contact support platform and the workpiece. In some embodiments, the at least one parameter of the non-contact support platform may be at least one of: distance between the plurality of nozzles, area of the non-contact support platform and flow rate of the supply system. In some embodiments, the at least one parameter of the workpiece may be at least one of: area of the workpiece, weight of the workpiece, and current support height of the workpiece above the non-contact support platform. In some embodiments, a distance between nozzles at the surface may be in the range of 5-15 millimeters. In some embodiments, a distance between the non-contact support platform and the workpiece may be in the range of 5-1000 microns In some embodiments, the controller may control pressure of fluid flow using at least one of: a pressure regulator, a pressure control valve and a rotational speed of an air pump. In some embodiments, the controller may control suction of fluid flow using at least one of: a vacuum regulator, a vacuum control valve, a vacuum bleeding valve and a rotational speed of an air pump. In some embodiments, the non-contact support platform may further include at least one pressure sensor, connected to the controller, and configured to measure the resistivity of the pressure source. In some embodiments, the non-contact support platform may further include at least one vacuum sensor, connected to the controller, and configured to measure the resistivity of the vacuum source. In some embodiments, the non-contact support platform may further include at least one workpiece position sensor, connected to the controller, and configured to measure the position of the workpiece along the surface.

There is thus provided, in accordance with some embodiments of the invention, a method of controlling a non-contact support platform to support a workpiece by fluid-bearing of an open-loop system, the method including: providing, by the non-contact support platform, a fluid through a plurality of nozzles to support the workpiece and controlling, by a controller connected to a supply system of the non-contact support platform, the fluid flow with an open-loop circuit to support the workpiece while it moves over the non-contact support platform. In some embodiments, the fluid flow may be controlled based on at least one parameter of a group of workpiece parameters consisting of a position of the workpiece, a dimension of the workpiece and a velocity of the workpiece while supported by the surface.

In some embodiments, the required flow rate for the workpiece may be determined by measuring at least one of: flow of the plurality of nozzles, distance between the plurality of nozzles, and area of the non-contact support platform. In some embodiments, the required flow rate for the workpiece may be determined by measuring at least one of: area of the workpiece, weight of the workpiece, and current support height of the workpiece above the non-contact support platform. In some embodiments, the controller may adjust the flow rate by the supply system in accordance with the movement of the workpiece. In some embodiments, the pressure of fluid flow may be controlled by the controller, using at least one of: a pressure regulator, a pressure control valve and a rotational speed of an air pump. In some embodiments, the suction of fluid flow may be controlled by the controller, using at least one of: a vacuum regulator, a vacuum control valve, a vacuum bleeding valve and a rotational speed of an air pump.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
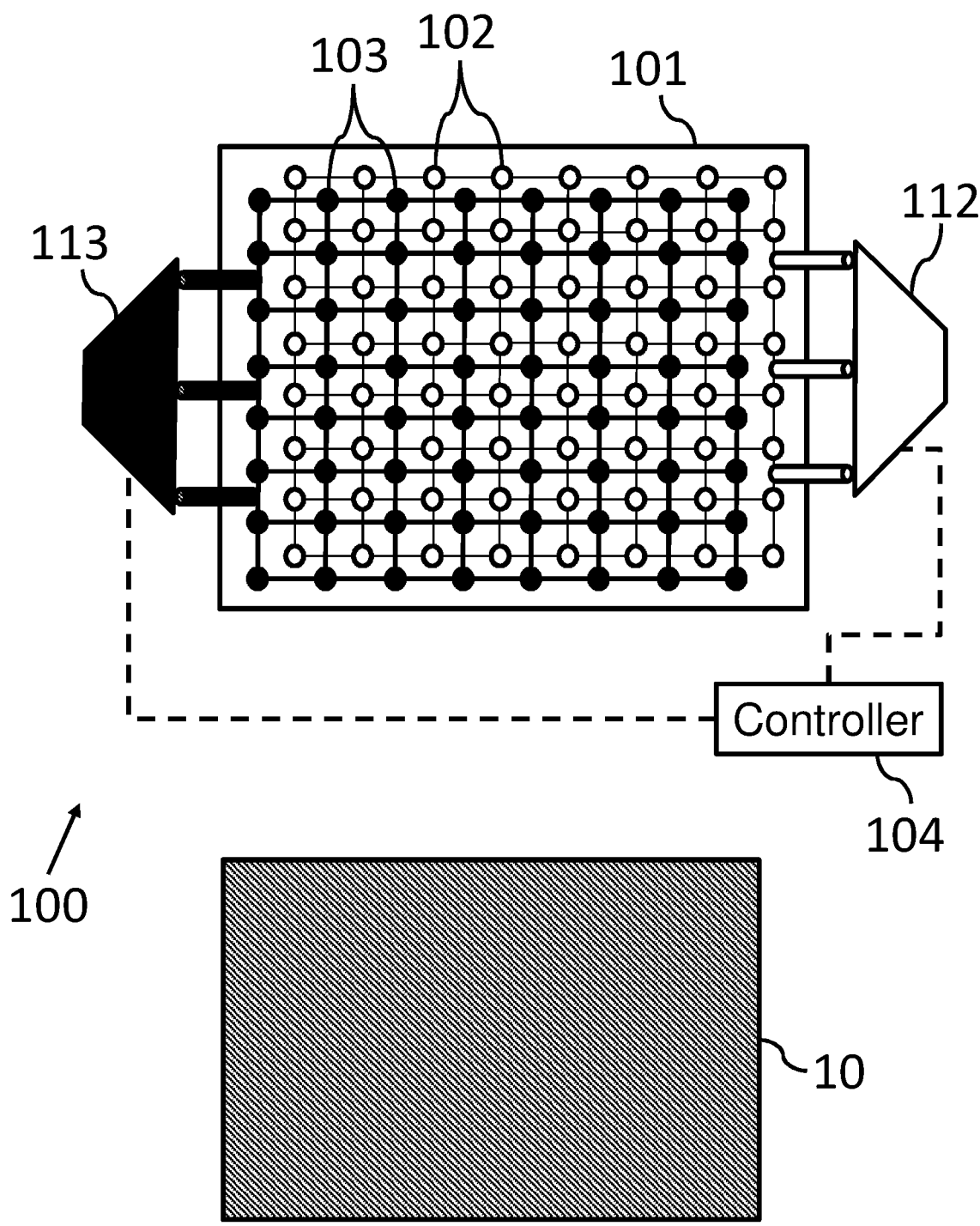
FIG. 1 shows a schematic illustration of a top view of a non-contact support platform with an open-loop control system, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

According to some embodiments, systems and methods are provided for open-loop control of high-performance non-contact support platforms.

Reference is made to FIG. 1, which is a schematic illustration of a top view of a non-contact support platform 100 with an open-loop control, according to some embodiments of the invention.

A non-contact support platform 100 may be configured to support, using air-bearing, a workpiece 10 for processing. For example, a thin workpiece 10 may include a thin pane of glass, e.g., for incorporation into a display screen, where the processing may include application of a substance or tool to the workpiece 10, or inspection of the workpiece 10. For optimal processing, without damage to the workpiece 10, the non-contact support platform 100 may be used to support the workpiece 10 without any contact.

The non-contact support platform 100 may include a surface 101 (e.g., like in a table) with a plurality of pressure nozzles 102 connected to a pressure source 112, and plurality of suction nozzles 103 connected to a vacuum source 113 (e.g., distributed in a grid). The surface 101 may support the workpiece 10 by fluid-bearing of fluid flowing through the plurality of nozzles. For instance, the plurality of pressure nozzles 102 may be connected to the pressure source 112, and/or the plurality of suction nozzles 103 may be connected to the vacuum source 113 via a respective tubing system, and/or via a manifold, operated by a pneumatic supply system. For example, the predetermined distance between pressure nozzles 102 and suction nozzles 103 may be 5-15 millimeters.

The surface 101 of the non-contact support platform 100 may include an air-bearing table with nozzles which are for instance simple holes in the air-bearing table. In some embodiments, the supply system, connected to the surface 101, may be configured to maintain the fluid-bearing by applying pressure to cause flow of the fluid out of a subset of the plurality of nozzles 102, 103. In some embodiments, the supply system may also be configured to apply vacuum to cause flow of the fluid into another subset of the plurality of nozzles 102, 103.

In some embodiments of the invention, the non-contact support platform may include self-adaptive segmented orifices (SASOs), such as described, for example in U.S. Pat. No. 7,530,778, incorporated herein by reference.

An open-loop control system may be a system that controls a process independently of the "output" or controlled variable (e.g., air pressure in a non-contact support platform) without any knowledge of its state, such that there is no expected response to a particular action. Using the open-loop control system there is no need to use specific real-time feedback (e.g., measured flow rate) to determine if the output has achieved the desired goal of the process.

In some embodiments, the non-contact support platform 100 may include an open-loop control and when the workpiece 10 is detected to arrive at a predetermined point at the surface 101, for instance with known parameters, it may be possible to accordingly govern adjustments of the pneumatic supply system for pressure and/or vacuum. The known parameters of the workpiece 10 may include size (length, width), weight, and expected advance speed. In some embodiments, the open-loop control of the non-contact support platform 100 may correspond to the changes in coverage by the workpiece 10 (e.g., while moving across the surface 101), without sensing pressure changes at the nozzles and/or without measuring the coverage changes.

In contrast, a closed loop system may require dedicated sensors at the nozzles to measure the parameter to be controlled, such as a system to measure the changes in the flow rate and coordinate a response to the measured changes in the flow rate. Thus, the non-contact support platform 100 with open-loop control has no need for such nozzle sensors, and instead controls the flow rate by initially determining how the workpiece 10 may move across the non-contact support platform 100 as well as how the non-contact support platform 100 reacts in return to some of the nozzles being covered by the workpiece 10.

A fluid (e.g., air) may flow from the surface 101 of the non-contact support platform 100 via the plurality of pressure nozzles 102 and/or may be sucked or evacuated away from the surface 101 of the non-contact support platform 100 via the plurality of suction nozzles 103 (e.g., with vacuum pressure). In some embodiments, the non-contact support platform 100 may include a pressure-atmosphere (PA) support platform, and/or a pressure-vacuum (PV) support platform. In some embodiments, the non-contact support platform 100 may include at least one controller or controllers 104 to control the pressure source 112 and/or the vacuum source 113 in order to control the flow rate at the non-contact support platform 100. The controlled flow rate may correspond to the fluid provided at the pressure nozzles 102 and/or removed at the suction nozzles 103.

Before the workpiece 10 is positioned on the surface 101 of the non-contact support platform 100 such that processing may begin, the workpiece may be gradually positioned over the non-contact support platform 100. Once the workpiece 10 is at least partially introduced to the surface 101 of the non-contact support platform 100, the workpiece 10 may cover at least some of the pressure nozzles 102 and/or suction nozzles 103. Accordingly, the flow rate at the surface 101 of the non-contact support platform 100 may automatically change due to changes in resistances of the pressure circuit and/or the vacuum circuit to support the workpiece 10. In some embodiments, the controller 104 may be configured to control the pressure source 112 and/or the vacuum source 113 such that the workpiece 10 may be introduced to the surface 101 of the non-contact support platform 100 with the flow rate controlled as in an open loop system (without consideration of any feedback or flow rate measurements).

In order to determine what pressures may be required by the pressure source 112 and/or by the vacuum source 113 for a particular workpiece 10, the movement of the workpiece over the non-contact support platform 100 may be analyzed with dedicated sensors (e.g., to measure the pressure field) until the proper flow rate may be derived for each type of workpiece 10. In some embodiments, once open-loop control is achieved, the flow rate at the surface 101 of the non-contact support platform 100 that is controlled by the controller 104, may be configured to maintain the processing at substantially similar performance while the workpiece 10 is introduced to the surface 101 of the non-contact support platform 100.

In some embodiments, the non-contact support platform 100 may adjust the flow rate with a pressure regulator and/or a pressure control valve and/or a suction (or vacuum) regulator and/or a suction (or vacuum) control valve and/or a suction (or vacuum) bleeding valve. In some embodiments, the non-contact support platform 100 may adjust the flow rate based on an air pump's rotational speed.

According to some embodiments, a single pneumatic supply system may be used for the pressure nozzles 102 and/or suction nozzles 103, instead of separate pressure source 112 and vacuum source 113 controlled by the controller 104. In some embodiments, the non-contact support platform 100 using only the pressure source 112 may adjust the flow rate with a pressure regulator and/or a pressure control valve. In some embodiments, the non-contact support platform 100 using only the vacuum source 113 may adjust the flow rate with a vacuum regulator and/or a vacuum control valve and/or a vacuum bleeding valve.

In some embodiments, the non-contact support platform 100 may adjust the flow rate by the controller 104 with a lookup table (e.g., after corresponding calibration) and/or with a determined function, for example with variables for positions of nozzles, area of the non-contact support platform 100, weight, and area of the workpiece 10 and/or the desired current support height of the workpiece above the non-contact support platform 100.

Figure 2A:
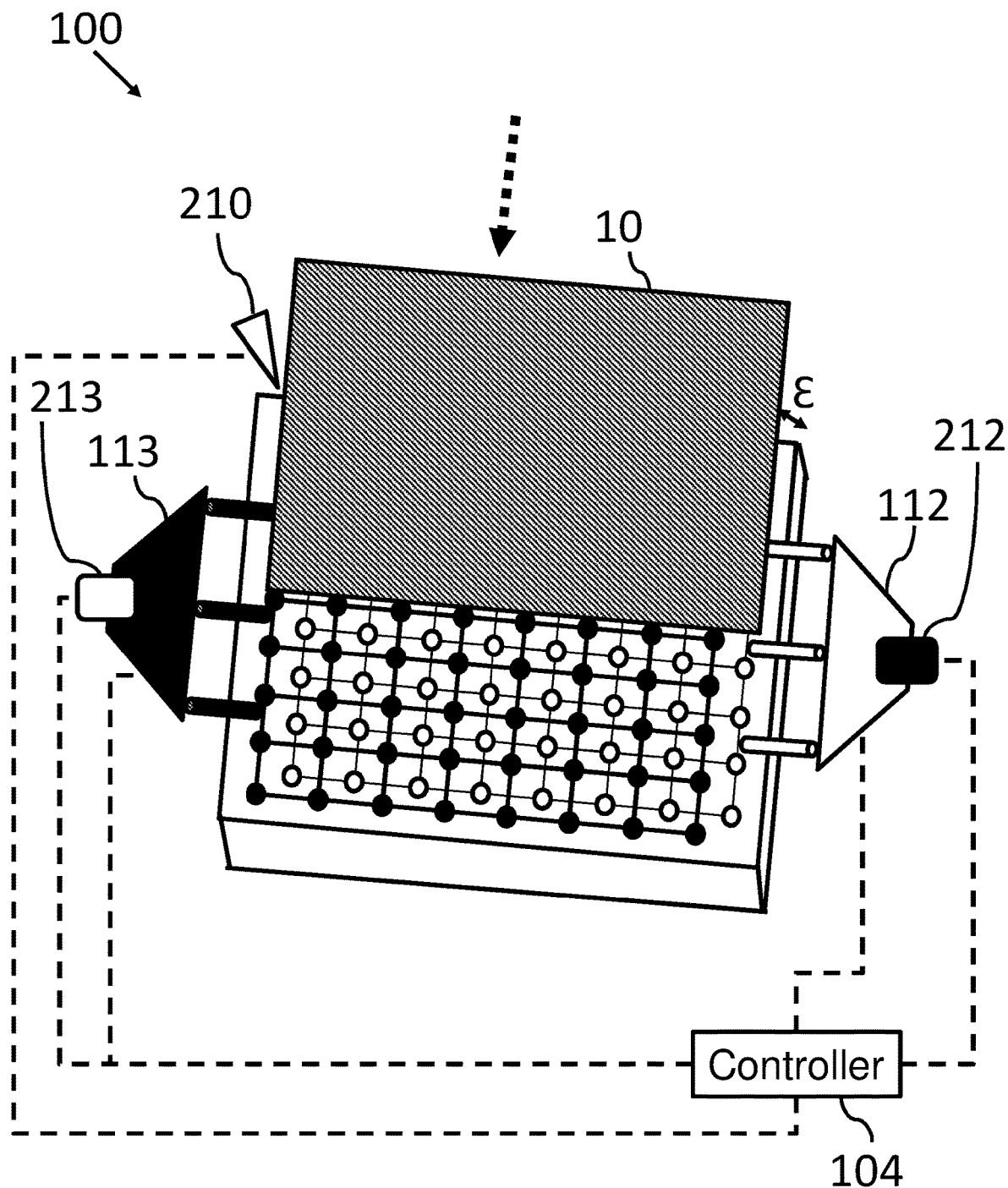
FIG. 2A shows a schematic illustration of a perspective view of a non-contact support platform with open-loop control with a workpiece at a partial coverage position over the non-contact support platform, according to some embodiments of the invention.
Figure 2B:
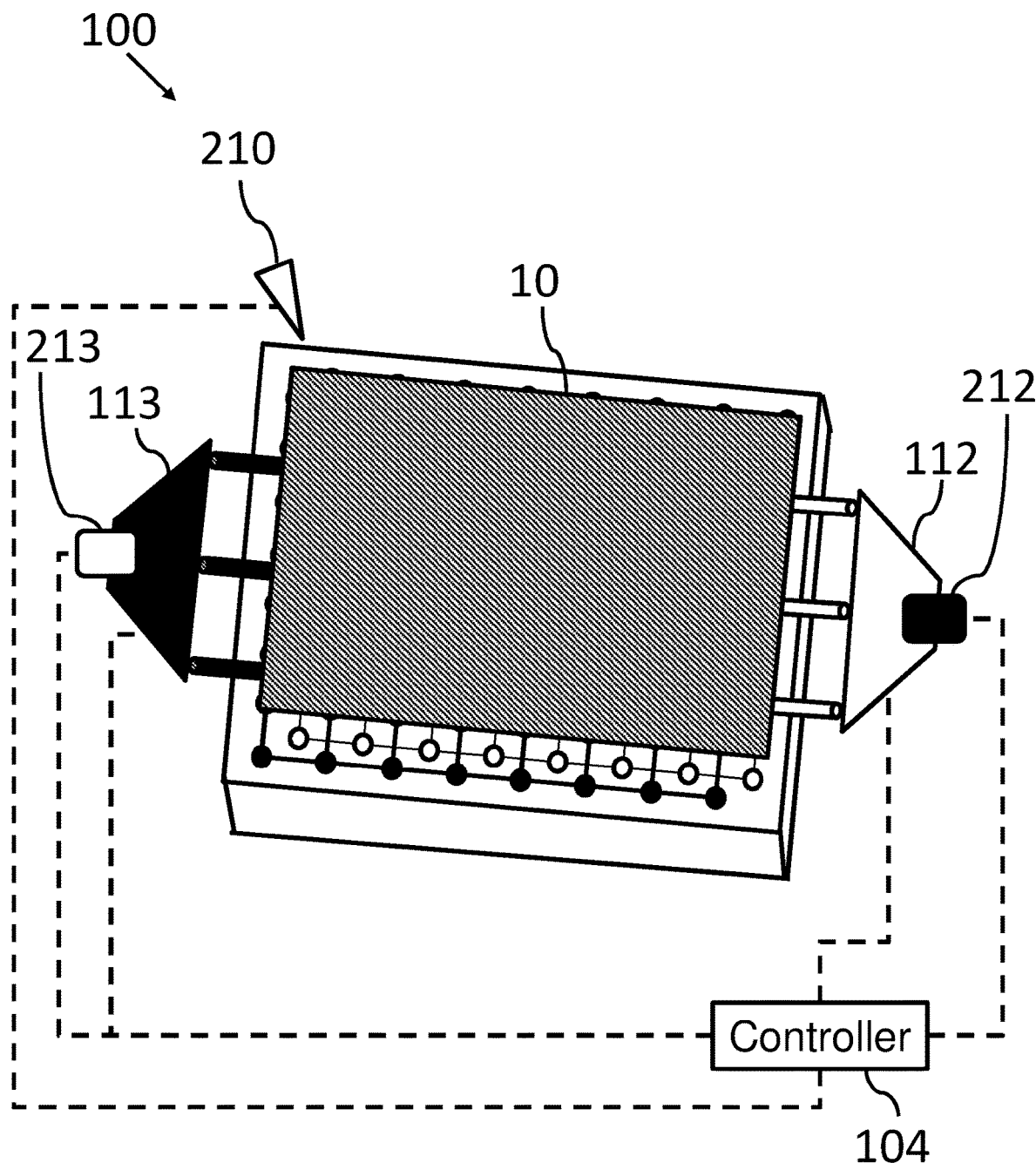
FIG. 2B shows a schematic illustration of a perspective view of a non-contact support platform with open-loop control with a workpiece at a partial coverage position over the non-contact support platform, according to some embodiments of the invention.

Reference is now made to FIGS. 2A and 2B, which are schematic illustrations of a perspective view of the non-contact support platform 100 with open-loop control, with the workpiece 10 at different positions covering the surface 101 of the non-contact support platform 100, according to some embodiments of the invention. It should be noted that the height 'ε' of the workpiece 10 above the surface 101 of the non-contact support platform 100 may affect the required flow rate since the flow rate supporting the workpiece 10 may be calculated to equate pressure and/or vacuum forces applied on the workpiece 10 such that for instance a moment may be achieved between the nozzles (with pressure/suction combination) for the required equilibrium of the workpiece 10 at a specific height (e.g., 5-1000 microns). In some embodiments, the weight of the workpiece 10 may also be considered during calculation due to the gravitational force applied on the workpiece 10.

Once the workpiece 10 is introduced to the surface 101 of the non-contact support platform 100, the resistivity of the circuit including the pressure source 112 and/or vacuum source 113 and/or the workpiece 10 may change as at least some of the nozzles may be covered, and therefore the controller 104 may be required to compensate that change. In some embodiments, the controller 104 may control the pressure source 112 and/or vacuum source 113 with activation of predetermined flow rates at each position of the workpiece 10 moving along the surface 101, in order to keep workpiece 10 at the same height 'ε'. The activation of the predetermined flow rates by the controller 104 may be carried out prior to the actual arrival of the workpiece 10 to the predicted position over the surface 101, due to the response time between the instructions from the controller 104 and the actual flow of fluid through the plurality of nozzles.

In some embodiments, at least one pressure sensor 212, connected to controller 104, may measure the resistivity of the circuit including the pressure source 112. In some embodiments, at least one vacuum sensor 213, connected to controller 104, may measure the resistivity of the circuit including the vacuum source 113. In some embodiments, at least one workpiece position sensor 210, connected to controller 104, may measure the position of the workpiece 10 while moving along the surface 101 of the non-contact support platform 100. Thus, the controller 104 may adjust the flow rate at the pressure nozzles 102 and/or suction nozzles 103 in accordance with the measured resistivity and/or the measured position of the workpiece 10 $X_0$, for instance at specific time $t_o$, by the at least one workpiece position sensor 210. In some embodiments, the controller 104 may calculate the position $X_1$ of the workpiece 10 at a different time $t_1$, with movement of the workpiece 10 along the surface 101, by multiplying the constant velocity 'U' of the workpiece 10 by the time interval between the specific time $t_o$ and the $t_1$ such as $X_1=X_0+U(t_1-t_o)$. In case that 'U' is a function of time U(t), $X_1=X_0+\int_{t_o}^{t_1}U(t)dt$. In some embodiments, the fluid flow may be controlled based on the position of the workpiece, the dimensions of the workpiece and the velocity of the workpiece while supported by the surface.

According to some embodiments, in case that the surface 101 of the non-contact support platform 100 is used without the open-loop control (e.g., of the pneumatic supply system), the pressure and/or suction (or vacuum) as measured at the surface 101 of the non-contact support platform 100 may be different for each step of processing of the workpiece 10. Thus, controlling the pneumatic supply system by controller 104 with the non-contact support platform 100 may cause the pressure and suction (or vacuum) as measured at the surface 101 of the non-contact support platform 100 to be substantially similar for each step.

In some embodiments, the non-contact support platform 100 may be used as a high-performance platform using fluid (e.g., gas and/or liquid) at positive gage pressure and/or negative gage pressure to handle a workpiece. In some embodiments, the non-contact support platform 100 may be used as a high-performance platform in at least one of inspection systems, coating systems, curing systems, conveying systems, and/or printing systems.

In some embodiments, the workpiece 10 may be introduced to cover the entire surface 101 of the non-contact support platform 100 in a short time (e.g., 0.5 second) so that the response by the non-contact support platform 100 may be required to be accordingly fast to adjust to changes while only a portion of the surface 101 of the non-contact support platform 100 may be covered.

In some embodiments, an initial measurement to determine the influence of the workpiece 10 introduced to at least partially cover the surface 101 of the non-contact support platform 100 may include measurement of the supply (pressure and/or vacuum) system for instance at predetermined distances (e.g., 10 millimeters) while the workpiece 10 moves over the surface 101 of the non-contact support platform 100, while taking into consideration that supply system response time of about 0.1 second. Other parameters may also be measured for a precise control of the non-contact support platform 100, such as height 'ε' of the workpiece 10, for instance measuring with a dedicated optical sensor (e.g., laser) to calculate a function for the movement of the workpiece 10. The time response of the substrate position and speed may be very fast (~0.01 seconds), while the time response of the supply system may be very slow (~0.1 second).

According to some embodiments, to study (e.g., with computerized learning or with a trial and error process) the movement of the workpiece 10 along the surface 101, the workpiece 10 may be introduced to the surface 101 of the non-contact support platform 100, such that the workpiece 10 may initially cover only the first row of nozzles. The pressure and/or vacuum supplies may be adjusted by controller 104 so that the workpiece 10 may be supported (e.g., to float) at the desired height 'ε'. In some embodiments, pressure and/or vacuum supplies may be recorded as well as the position of the workpiece 10. When the workpiece 10 moves to cover another row of nozzles, the pressure and/or vacuum supplies may be adjusted again by controller 104 so that the workpiece 10 may be supported (e.g., to float) at the desired height 'ε', and so on until the entire workpiece 10 is supported by the non-contact support platform 100 at the desired height 'ε', and/or until the entire non-contact support platform 100 is supporting the workpiece 10 (e.g., depending on which is of larger size). In some embodiments, pressure and/or vacuum supplies may be recorded again as well as the position of the workpiece 10 to determine any required changes in adjustments of the pressure and/or vacuum supplies while the workpiece 10 moves along the surface 101.

The workpiece 10 may then be moved further (not shown in the figures) such that first row of nozzles is no longer covered. The pressure and/or vacuum supplies may be adjusted by controller 104 so that the workpiece 10 may be supported (e.g., to float) at the desired height 'ε' at the new state. In some embodiments, pressure and/or vacuum supplies may be recorded as well as the position of the workpiece 10 at the new state with the whole process repeated where a new row of nozzles is no longer covered due to movement of the workpiece 10. All recorded data may be provided to controller 104 for analysis, for instance in a lookup table with pressure and/or vacuum values for each position of the workpiece 10 along the surface 101. In some embodiments, the controller 104 may be configured to apply specific pressure and/or vacuum values when the workpiece 10 reaches a corresponding position along the surface 101.

In some embodiments, the movement of the workpiece 10 may be carried out while taking into account static errors into the calculation of the required flow rates. A static time delay 'dts' of the pneumatic system may be determined by placing the workpiece 10 in a particular position measured with a height sensor, for instance increasing the pressure by 10%, and measuring the time between the trigger command issued from the controller 104 and the response of the workpiece 10 as measured by the height sensor. The workpiece 10 may be positioned on a first part $X_O$ of the surface 101 and a corresponding pressure valve $P_O$ may be set so that the height between the surface 101 and the workpiece 10 may be a predetermined value '$\varepsilon_n$'. The workpiece 10 may then be moved to a distance $X_1$ along the surface 101. The resistance of the circuits, for instance including the pressure and/or vacuum supplies with all connected tubing as well as the workpiece 10, may vary as a result of different coverage of the workpiece 10 above the surface 101 and the gap height may vary from the predetermined value $\varepsilon_n$. A pressure regulator may be set to $P_1$ such that $P_1-P_O=dP$ so that the gap height may return to the predetermined value $\varepsilon_n$. The process of switching between $P_O$ and $P_1$ may then be carried out while the workpiece 10 moves at a predefined velocity 'U'. For example, the trigger to switch between $P_O$ and $P_1$ may be carried out by the controller 104 in position X* which is $X^*=X_1-U^*dts$. The uniformity of the height of the gap height '$\varepsilon$' may be examined in the area between $X_O$ and $X_1$ by moving the workpiece 10 back and forth at the predefined velocity 'U' and measuring the height of the gap '$\varepsilon$' by the height sensor. Such a test may be performed at a number of points around the delay time as measured by the static measurement. In some embodiments, such a test may also be performed again with the workpiece 10 moving between different positions $X_1$ and $X_2$ and so on for each pair of positions along the surface 101, $X_n$ and $X_{n+1}$.

Figure 3:
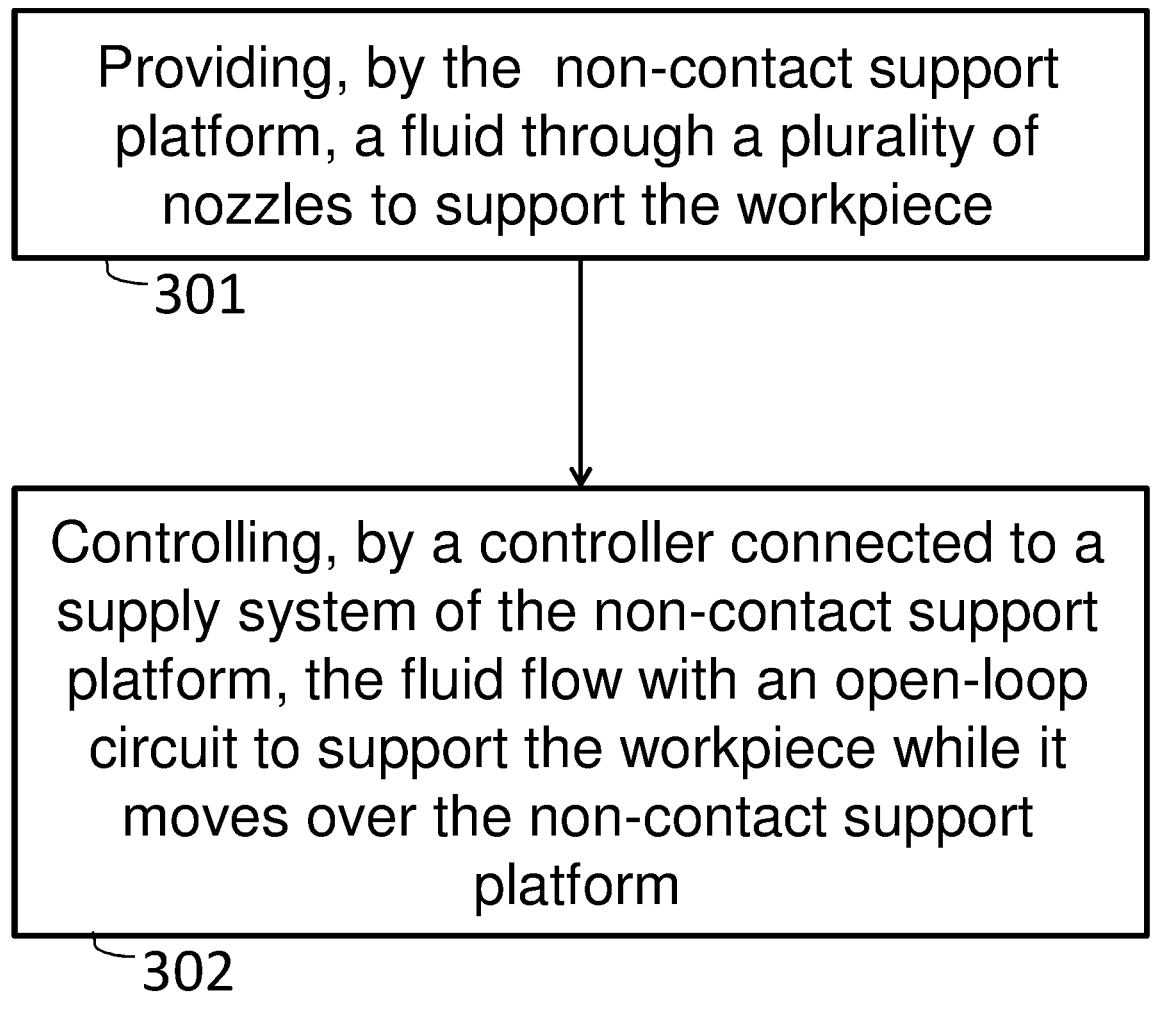
FIG. 3 shows a flowchart of a method of open loop control of a non-contact support platform for supporting a workpiece, according to some embodiments of the invention.

Reference is now made to FIG. 3, which shows a flowchart of a method of open loop control a non-contact support platform for supporting a workpiece, according to some embodiments of the invention. The non-contact support platform 100 may provide at step 301 a fluid through a plurality of nozzles 102, 103 to support the workpiece 10. In some embodiments, the fluid may be provided via nozzles at the surface 101 of the non-contact support platform 100. The controller 104 connected to a supply system 112, 113 of the non-contact support platform 100 may control at step 302 the fluid flow with an open-loop circuit to support the workpiece 10 while it moves over the surface 101 of the non-contact support platform 100. In some embodiments, the fluid flow may be controlled based on the position of the workpiece, the dimensions of the workpiece and the velocity of the workpiece while supported by the surface.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A non-contact support platform with open-loop control, comprising:

a surface, to support a workpiece by fluid-bearing of fluid flowing through a plurality of nozzles;

a supply system, connected to the surface and configured to maintain the fluid-bearing by applying pressure to cause flow of the fluid out of a subset of the plurality of nozzles; and a controller, to predict a position where the workpiece is to arrive in a given time as it moves over the surface and to control fluid flow in the supply system with an open-loop circuit to support the workpiece while it moves over the non-contact support platform prior to arrival of the workpiece at said position so that the workpiece is at a predetermined support height above the surface when the workpiece arrives at said position, wherein the fluid flow is controlled based on at least one parameter of a group of workpiece parameters consisting of a measured position of the workpiece along the surface, dimensions of the workpiece and a velocity of the workpiece while supported by the surface.

2. The non-contact support platform of claim 1, wherein the supply system is also configured to apply vacuum to cause flow of the fluid into another subset of the plurality of nozzles.

3. The non-contact support platform of claim 1, wherein the supply system comprises at least one of pressure source and vacuum source.

4. The non-contact support platform of claim 1, wherein the controller is further configured to control the fluid flow in the supply system based on at least one parameter of the non-contact support platform and the workpiece.

5. The non-contact support platform of claim 4, wherein the at least one parameter of the non-contact support platform is at least one of: area of the non-contact support platform and flow rate of the supply system.

6. The non-contact support platform of claim 4, wherein the at least one parameter of the workpiece is at least one of: area of the workpiece, weight of the workpiece, and current support height of the workpiece above the non-contact support platform.

7. The non-contact support platform of claim 1, wherein a distance between nozzles at the surface is in the range of 5-15 millimeters.

8. The non-contact support platform of claim 1, wherein a distance between the non-contact support platform and the workpiece is in the range of 5-1000 microns.

9. The non-contact support platform of claim 1, wherein the controller controls pressure of fluid flow using at least one of: a pressure regulator, a pressure control valve, and a rotational speed of an air pump.

10. The non-contact support platform of claim 1, wherein the controller controls suction of fluid flow using at least one of: a vacuum regulator, a vacuum control valve, a vacuum bleeding valve, and a rotational speed of an air pump.

11. The non-contact support platform of claim 1, further comprising at least one pressure sensor, connected to the controller, and configured to measure the resistivity of the pressure source.

12. The non-contact support platform of claim 1, further comprising at least one vacuum sensor, connected to the controller, and configured to measure the resistivity of the vacuum source.

13. The non-contact support platform of claim 1, further comprising at least one workpiece position sensor, connected to the controller, and configured to measure the position of the workpiece along the surface.

14. A method of controlling a non-contact support platform to support a workpiece with an open-loop system, the method comprising:
  providing, by the non-contact support platform, a fluid through a plurality of nozzles to support the workpiece;
  predicting a position where the workpiece is to arrive in a given time as it moves over the surface; and
  controlling, by a controller connected to a supply system of the non-contact support platform, the fluid flow with an open-loop circuit to support the workpiece while it moves over the non-contact support platform prior to arrival of the workpiece at said position so that the workpiece is at a predetermined support height above the surface when the workpiece arrives at said position,
  wherein the fluid flow is controlled based on at least one parameter of a group of workpiece parameters consisting of a measured position of the workpiece, a dimension of the workpiece and a velocity of the workpiece while supported by the non-contact support platform.

15. The method of claim 14, further comprising initially determining, during a calibration, a required flow rate for supporting the workpiece at the predetermined support height by measuring at least one of: area of the workpiece, weight of the workpiece, and current support height of the workpiece above the non-contact support platform.

16. The method of claim 14, further comprising adjusting, by the controller, the flow rate by the supply system in accordance with the movement of the workpiece.

17. The method of claim 14, wherein the supply system is also configured to apply vacuum to cause flow of the fluid into another subset of the plurality of nozzles.

18. The method of claim 14, wherein the supply system comprises at least one of pressure source and vacuum source.

19. The method of claim 14, further comprising controlling pressure of fluid flow, by the controller, using at least one of: a pressure regulator, a pressure control valve, and a rotational speed of an air pump.

20. The method of claim 14, further comprising controlling suction of fluid flow, by the controller, using at least one of: a vacuum regulator, a vacuum control valve, a vacuum bleeding valve, and a rotational speed of an air pump.

* * * * *